United States Patent
Ota et al.

(10) Patent No.: US 6,365,300 B1
(45) Date of Patent: Apr. 2, 2002

(54) LITHIUM SECONDARY BATTERY

(75) Inventors: Nobuhiro Ota; Shosaku Yamanaka, both of Hyogo (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/601,498

(22) PCT Filed: Nov. 29, 1999

(86) PCT No.: PCT/JP99/06668

§ 371 Date: Sep. 15, 2000

§ 102(e) Date: Sep. 15, 2000

(87) PCT Pub. No.: WO00/33409

PCT Pub. Date: Jun. 8, 2000

(30) Foreign Application Priority Data

Dec. 3, 1998 (JP) .............................. 10-344593
Jan. 14, 1999 (JP) .............................. 11-007736
Mar. 24, 1999 (JP) .............................. 11-078733

(51) Int. Cl.$^7$ .............................................. H01M 6/18
(52) U.S. Cl. ...................... 429/304; 429/188; 429/303; 429/307; 429/322; 429/324
(58) Field of Search .................. 429/188, 303, 429/304, 307, 322, 324

(56) References Cited

U.S. PATENT DOCUMENTS

| | | |
|---|---|---|
| 4,599,284 A | 7/1986 | Akridge |
| 5,085,953 A | 2/1992 | Akridge et al. |
| 5,217,826 A | 6/1993 | Yamamura et al. |
| 5,314,765 A * | 5/1994 | Bates |
| 5,494,762 A | 2/1996 | Isoyama et al. |
| 5,686,203 A * | 11/1997 | Idota et al. .................. 429/194 |
| 6,025,094 A * | 2/2000 | Visco et al. |
| 6,245,465 B1 * | 6/2001 | Angell et al. ................ 429/340 |

FOREIGN PATENT DOCUMENTS

| | | |
|---|---|---|
| EP | 0 206 339 | 12/1986 |
| JP | 6-275314 | 9/1994 |
| JP | 6-283157 | 10/1994 |
| JP | 6-290773 | 10/1994 |
| JP | 8-195219 | 7/1996 |
| JP | 8-329983 | 12/1996 |
| JP | 9-82329 | 3/1997 |
| JP | 10-189047 | 7/1998 |

* cited by examiner

*Primary Examiner*—Carol Chaney
*Assistant Examiner*—Dah-Wei D. Yuan
(74) *Attorney, Agent, or Firm*—McDermott, Will & Emery

(57) ABSTRACT

A lithium secondary battery that can suppress short circuits caused by the generation of dendrites from the negative electrode, that has high energy density, and that is excellent in charge and discharge-cycle performance. The lithium secondary battery comprises an electrolytic layer, a positive electrode, and a negative electrode that is made of a lithium-containing material. The electrolytic layer is made of an inorganic solid electrolyte. The positive electrode contains an organic high polymer. It is desirable that the electrolytic layer contain at least one type selected from the group consisting of oxygen, sulfur, nitrogen, sulfide, and oxynitride. It is also desirable that the organic electrolysis solution contained in the positive electrode have a lithium ion-conductivity lower than that of the inorganic solid electrolyte constituting the electrolytic layer.

32 Claims, 1 Drawing Sheet

LITHIUM SECONDARY BATTERY

TECHNICAL FIELD

Figure 1:
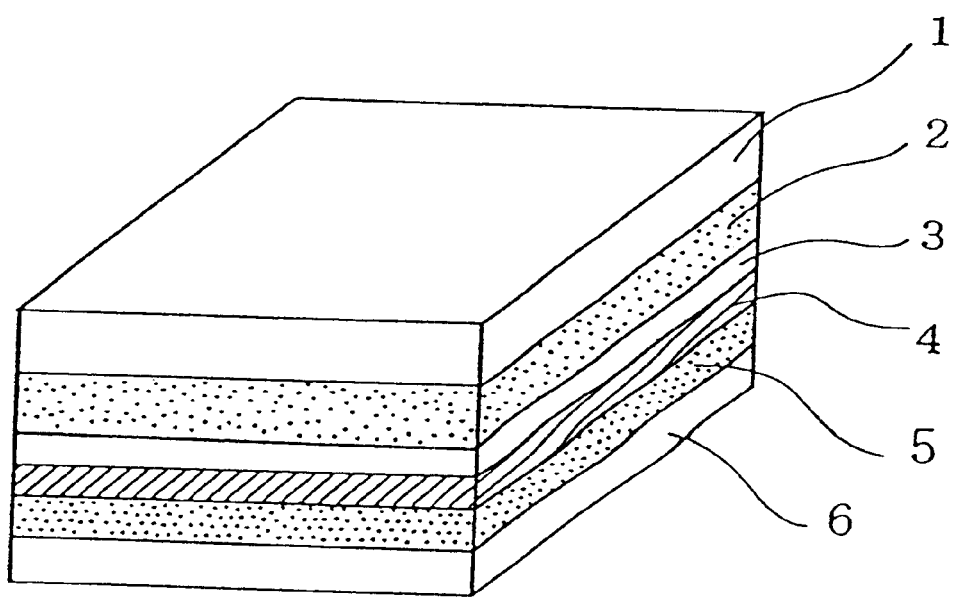

The present invention relates to a lithium secondary battery that has large capacity and remarkable safety, especially to a lithium secondary battery that can suppress short circuits caused by the generation of dendrites from the negative electrode, that has high energy density, and that is excellent in charge and discharge-cycle performance.

BACKGROUND ART

Lithium secondary batteries with an organic electrolysis solution have been widely used. Their attractive feature being their high energy output per unit volume or unit weight in comparison with other batteries. In exploiting this advantage, researchers and engineers have been advancing the development and practical applications of the batteries as a power source for mobile communication devices, notebook-type personal computers, and electric vehicles.

The types of lithium secondary batteries include an organic electrolysis solution type, in which an organic electrolysis solution is impregnated in a porous polymer separator, and a gel polymer type, in which a gelatinous polymer. containing a large amount of electrolysis solution is used.

Both the organic electrolysis solution type and the gel polymer type have a substantial amount of electrolysis solution, thus posing problems. The problems include a poor withstanding property against voltage, instability against the electrode material (especially against carbon which is usually used as the negative electrode), and gas evolution. In addition, these organic electrolysis solutions are intrinsically inflammable substances, and therefore a short circuit resulting from a temperature rise or shock for any reason may cause an explosion.

Moreover, organic electrolysis solution-type and gel polymer-type batteries have been required to increase the energy density as their important technical challenge. Their limit at the present is about 300 Wh/l, and it is strongly required to increase this limit to 400 Wh/l or more. Researchers and engineers have been studying the use of metallic lithium as the negative electrode in order to solve the foregoing problems and improve the properties effectively.

However, when a lithium-containing material is used as the negative electrode, the electrolytic layer is affected by the change in the thickness of the metallic lithium utilized in charging and discharging and by the change in the shape of the negative electrode at the time of charge and discharge. It is particularly notable at increased cycles, such as several hundred cycles or more. Metallic lithium has a strong tendency to react with water vapor in the air, so that it is necessary to provide a device to block the air in the filming process.

Moreover, with a lithium secondary battery containing an organic electrolysis solution, repetition of charge and discharge causes dendritic metallic lithium to grow on the surface of the metallic lithium. This may cause an internal short circuit between the electrodes, triggering explosion and other abnormalities.

To eliminate this possibility, the following techniques have been proposed:

1. Formation of a compound layer by treating the surface of the metallic lithium to be used as the negative electrode. The types of compound layers include a polymer layer, a fluoride layer, a carbonic compound layer, and an oxide layer.

2. Production of an entirely solid battery containing no electrolysis solution that may cause explosion. For example, an organic polymer or inorganic crystals can be used as the electrolyte.

The foregoing techniques, however, have the following problems:

1-3. It is known that the techniques for the surface treatment of the metallic lithium include the following:

(a) The surface treatment is performed before forming the battery.

(b) A compound layer is formed by spontaneously reacting the metallic lithium with the compounds in the electrolysis solution and in the material for the positive electrode when the battery is formed.

1-2. In (a) above, it is understood that the acid treatment or plasma treatment forms a lithium fluoride, a lithium carbonate, or a lithium oxide layer, each of which is effective in suppressing the growth of the lithium dendrite at the time of charge and discharge. With this technique, however, repetition of charge and discharge poses problems such as the formation of voids at the interface, separation of the compound layer, and concentrated growth of metallic lithium in cracks and pinholes in the compound layer.

1-3. In (b) above, because substances that form a compound layer by reacting with metallic lithium are added in the organic electrolysis solution, a compound layer is formed continually at the interface on condition that the metallic lithium comes into contact with the electrolysis solution. As a result, although problems such as separation can be avoided with high possibility, impurities inevitably contained in the organic electrolysis solution cause the compound layer formed on the surface of the metallic lithium to be nonuniform. This reduces the effectiveness in suppressing the growth of the dendrites of metallic lithium.

2-1. The entirely solid type has a solid electrolyte. This poses a problem in the contact between the electrode and the electrolyte. The resultant reduction in the contact area increases the contact resistance, preventing the extraction of a large amount of the electric current.

2-2. The difficulty in handling the solid electrolyte restricts application forms. The types of materials as the solid electrolyte include a sulfide family, an oxide family, a nitride family, and a mixture of these, such as an oxynitride family and an oxysulfide family. However, although a compound containing sulfide has high lithium-ion conductivity, it has drawbacks such as high hygroscopic property and high hydrolytic property at the same time. These drawbacks cause the electrolytic layer to be difficult to handle after it is formed. More specifically, the electrolytic layer requires to be sealed in an inert gas atmosphere during the formation of the battery and transportation. It also requires provision of a glove box. These requirements pose problems in productivity and cost.

2-3. Lithium ion-conductive solid electrolytes mainly have been studied as a bulk-shaped sintered body or a powder for practical use. This restricts application forms, reduces total ionic conductivity, and lowers battery performance. On the other hand, when a thin-film electrolyte is used, it is difficult to suppress the formation of pinholes and cracks. In particular, when the positive electrode contains an organic electrolysis solution, the electrolysis solution effusing from the positive electrode penetrates through the pinholes and cracks to reach the surface of the negative electrode. Then, the electrolysis solution reacts with the negative electrode to cause concentrated growth of dendrites at the pinholes and cracks. This may cause a problem of short circuiting between the electrodes. In addition, when the current capacity per unit area is increased, the stress caused by the volume change of the negative electrode at the time of charge and discharge may fracture the electrolytic layer.

Consequently, the main object of the present invention is to offer a lithium secondary battery that can suppress short circuits caused by the generation of dendrites from the negative electrode, that has high energy density, and that is excellent in charge and discharge-cycle performance.

DISCLOSURE OF THE INVENTION

The present invention achieves the foregoing object by providing an electrolytic layer that is formed by an inorganic solid electrolyte and a positive electrode that contains an organic high polymer. This constitution prevents the growth of dendrites on the metallic lithium at the time of charge and discharge, suppresses the reaction between the organic electrolysis solution and the negative electrode, and suppresses the temperature rise in the battery even at the time of over charging. In short, an explosion can be avoided. The following is a detailed explanation of the electrolytic layer, positive electrode, negative electrode, and battery constitution. These conditions can be utilized separately or in combination.

FIG. 1 is an enlarged cross section of the main portion of the lithium secondary battery produced in Example 4-1. The battery comprises a collector 1, a positive electrode 2, a separator 3, an inorganic solid electrolytic layer 4, a negative electrode 5, and a collector 6.

Electrolytic Layer
<Material>

It is effective to use an inorganic solid electrolyte as the electrolytic layer. This is because an inorganic solid electrolyte forms an interfacial layer having a graded structure composition at the interface with the metallic lithium. Whereas an organic polymer produces a definite interface between the metallic lithium and the organic polymer layer, an inorganic solid electrolyte forms at the interface a layer in which the metallic lithium and .th lithium-containing inorganic compound are mixed, thereby preventing the separation.

Examples of the inorganic solid electrolytes include a sulfide family, an oxide family, a nitride family, and a mixture of these, such as an oxynitride family and an oxysulfide family. The types of the sulfides include $Li_2S$ and compounds of $Li_2S$ and $SiS_2$, $GeS_2$, or $Ga_2S_3$. The types of the oxynitrides include $Li_3PO_{4-x}N_{2x/3}$, $Li_4SiO_{4-x}N_{2x/3}$, $Li_4GeO_{4-x}N_{2x/3}$ (where $0<X<4$), and $Li_3BO_{3-x}N_{2x/3}$ (where $0<X<3$).

In particular, when sulfur is contained, the interfacial layer having a graded structure in composition can be easily formed at the surface of the metallic lithium. The formation of this interfacial layer can prevent the separation of the inorganic solid electrolytic layer caused by the penetration of the organic electrolysis solution into the gap at the interface between the metallic lithium and the inorganic solid electrolytic layer when the metallic lithium deposits and dissolves at the negative electrode at the time of charge and discharge.

Furthermore, the present inventors found that when at least either oxygen or nitrogen is contained in addition to the sulfur, the foregoing effect is intensified. The reason is that oxygen or nitrogen reacts strongly with the metallic lithium to further increase the bonding between the inorganic solid electrolytic layer and the metallic lithium. This addition of oxygen or nitrogen also materializes an ionic conductivity as high as $10^{-3}$ to $10^{-2}$ S/cm. This is attributable to the effect of the difference in polarity between the constituting elements and of the generation of distortion in the network structure, which distortion produces interstices in which lithium ions can readily travel. This addition is also effective in suppressing the high hygroscopic property, one of the drawbacks of these materials, especially the oxysulfide family.

It is desirable that the inorganic solid electrolytic layer contain an elementary lithium of not less than 30 atm. % and not more than 65 atm. %. If less than 30 atm. %, the ionic conductivity decreases, thereby giving the layer high resistance. This low content also deteriorates the bonding quality between the inorganic solid electrolytic layer and the metallic-lithium layer. If more than 65 atm. %, although the bonding quality between the inorganic solid electrolytic layer and the metallic-lithium layer is improved, the inorganic solid electrolytic layer becomes polycrystallized and porous, making it difficult to form a dense, continuous film of the inorganic solid electrolyte. In addition to that, this high content produces electronic conductivity to cause internal short circuits when the battery is formed. The result is deterioration of the battery performance. Therefore, it is desirable that the electrolytic layer be amorphous.

It is desirable that the inorganic solid electrolyte contain in addition to the lithium at least one type of element selected from the group consisting of phosphorus, silicon, boron, aluminum, germanium, and gallium (hereinafter, these elements are called "additional elements") and also contain sulfur. As mentioned previously, it is effective if the inorganic solid electrolyte is amorphous. These "additional elements" can form this amorphous framework by constituting a network structure through sulfur and supply sites with a size suitable for the lithium ions to travel. The "additional elements" can also give negative charges suitable in amount in order for sulfur atoms at the ends of the amorphous framework to trap positively charged lithium ions. In other words, the negatively charged sulfur atoms at the ends trap positively charged lithium ions moderately and mildly so that the lithium ions can travel without being undesirably firmly fixed.

As described previously, at least either oxygen or nitrogen can be added to the inorganic solid electrolyte in addition to the lithium, "additional elements," and sulfur. The oxygen or nitrogen can further increase the lithium-ion conductivity. This is attributable to the effectiveness of the oxygen or nitrogen atoms widening the interstices in the formed amorphous framework, thus alleviating the interference of the movement of the lithium ions.

Another effect of the "additional elements" contained in the inorganic solid electrolyte is the improvement in bonding quality between the inorganic solid electrolytic layer and the metallic lithium. The "additional elements" further increases an affinity between the inorganic solid electrolyte and the metallic lithium. As described before, the addition of lithium, sulfur, oxygen, and nitrogen improves the bonding quality between the inorganic solid electrolytic layer and the metallic lithium. However, the addition of elements other than the foregoing four types of elements and the "additional elements" deteriorates the affinity between the inorganic solid electrolytic layer and the metallic lithium, so that the inorganic solid electrolytic layer tends to separate easily from the metallic lithium.

<Ionic Conductivity>

The present inventors found the following ionic conductivity-related mechanism: Ionic conductivity is an important property of the constituent materials of the electrolytic layer. Nevertheless, with the conventional techniques, the compound layers formed on the metallic lithium have an ionic conductivity no more than $10^{-7}$ S/cm at room temperature. This low conductivity permits an organic electrolysis solution that has an ionic conductivity of the order of $10^{-3}$ S/cm to penetrate into the interface between the compound layer and the metallic lithium through unavoidably existing pinholes and cracks even when the compound layer has a thickness no more than several nanometers. Consequently, the lithium ions tend to flow through the highly ion-conductive organic electrolysis solution. As a result, the interface between the compound layer and the metallic lithium suffers erosion, so that the compound layer easily separates from the metallic lithium. The result is a reduction in the covering effect.

To avoid the foregoing mechanism, the present invention form a highly ion-conductive electrolytic layer in order for the lithium ions to flow mainly through the electrolytic layer. It is desirable that the electrolytic layer have a lithium-ion conductivity of $10^{-5}$ S/cm or more at 25° C. Even when the electrolytic layer (a film) has pinholes and cracks, the metallic lithium in the pinholes and cracks react with carbon dioxide ions, oxygen gas, water molecules, or fluorine ions that are contained in the electrolysis solution as unavoidable impurities, to form on the surface of the metallic lithium a low ion-conductive layer, such as a lithium carbonate, lithium oxide, or lithium fluoride layer. This low ion-conductive layer protects the pinholes and cracks to suppress the growth of dendrites and to cause the lithium ions to flow mainly through the electrolytic layer. It is more desirable that the inorganic solid electrolytic layer have a lithium-ion conductivity of $5 \times 10^{-4}$ S/cm or more at 25° C., which is 10% or more of the ionic conductivity of the organic electrolysis solution. It is preferable that the inorganic solid electrolytic layer have a lithium-ion conductivity of $1 \times 10^{3}$ S/cm or more at 25° C.

In addition, it is desirable that at least one of the following measures be incorporated into the formation of a battery in order to effectively form a low ion-conductive compound in combination with metallic lithium:

(a) to intentionally add in advance to the organic electrolysis solution carbon dioxide, halides, an anionically polymerizing organic monomer, or an organic molecule that forms a compound with lithium;

(b) to use as the electrolytic salt (a solute) for the organic electrolysis solution imide-family organic lithium or another material that permits fluorine compounds to dissolve easily; and (c) to use as the positive-electrode material a disulfide-family organic material or another material that permits sulfur compounds to dissolve in the organic electrolysis solution.

<Dual-Layer Structure>

The dual-layer structure of the foregoing inorganic solid electrolytic layer further facilitates its handling. Although lithium-ion conductive compounds containing sulfide as the material for the electrolytic layer have high lithiumion conductivity, they have the drawback of having simultaneously a high hygroscopic property and high hydrolytic property, as described previously. On the other hand, although lithium-ion conductive compounds containing oxide have chemical stability against the air, they are unstable against low ion-conductive compounds and the metallic lithium in the negative electrode. Consequently, when an electrolytic layer consists of two layers (a negative electrode-side layer and a positive electrode-side layer) in which the negative electrode-side layer is a film made of a lithium-ion conductive compound containing sulfide (lithium sulfide or silicon sulfide) and the positive electrode-side layer is a film made of a lithium-ion conductive compound containing oxide, the electrolytic layer can be stable against the air and have high ionic conductivity.

The positive electrode-side layer acts as a protective film that prevents the reaction with water vapor while the electrolytic layer is in the air and dissolves into the organic electrolysis solution when incorporated into a battery. Moreover, dissolved constituent elements of the positive electrode-side layer form a low ion-conductive layer by reacting in the pinholes and cracks in the electrolytic layer with the metallic lithium to prevent the concentrated growth of dendrites.

It is effective for the positive electrode-side layer as the protective film to be a lithium-ion conductive body that contains not only phosphorous but also at least either oxygen or nitrogen. Specifically, a phosphate or phosphorus oxynitride compound is suitable.

It is effective for the positive electrode-side layer to contain an Li constituent not less than 30 atm. % and not more than 50 atm. %. If less than 30 atm. %, a strong possibility of imperfect dissolution may result. If more than 50 atm. %, the hygroscopic property emerges so that the layer cannot act as the protective film.

It is desirable that the positive electrode-side layer be thin. However, if it is excessively thin, the negative electrode-side layer containing sulfides cannot be effectively isolated from the air. It is desirable that the positive electrode-side layer have a thickness not less than 10 nm or not less than 1% of the thickness of the negative electrode-side layer. If the positive electrode-side layer is excessively thick, it becomes difficult to maintain the high ionic conductivity and to dissolve in the electrolysis solution. Specifically, it is desirable that the positive electrode-side layer have a thickness not more than 25 $\mu$m or not more than 50% of the thickness of the negative electrode-side layer. In particular, when the negative electrode-side layer is a film made of lithium ion-conductive compounds containing sulfide and the positive electrode-side layer is a film made of lithium ion-conductive compounds containing oxide, it is desirable that the positive electrode-side layer have a thickness not less than 0.1 $\mu$m and not more than 2 $\mu$m in terms of the battery performance.

<Thickness>

It is desirable that the electrolytic layer have a total thickness not less than 50 nm and not more than 50 $\mu$m. If the thickness is more than 50 $\mu$m, although the covering effect is further increased, the ionic conductivity is decreased to deteriorate the battery performance. Moreover, the time and energy needed for the formation of the film increase excessively to cause the film to be unpractical. In particular, the resistance of the electrolytic layer against the ionic conduction increases, posing a problem in that the output current cannot be sufficiently increased. If the thickness is less than 50 nm, the electron-conductive component increases, posing a problem in that it tends to cause self-discharging. In addition, it becomes difficult to suppress the formation of pinholes in the thin-film electrolyte. As a result, when the positive electrode contains an organic electrolysis solution, the electrolysis solution effusing from the positive electrode penetrates through the pinholes to reach the surface of the negative electrode. Then, the electrolysis solution reacts with the negative electrode to cause dendrites to form, posing another problem.

In particular, when the foregoing dual-layer structure is employed, it is desirable that the electrolytic layer have a total thickness not less than 2 $\mu$m and not more than 22 $\mu$m.

If the thickness is less than 2 μm, it becomes difficult to suppress the formation of pinholes and cracks in the thin-film electrolyte. As a result, when the positive electrode contains an organic electrolysis solution, the electrolysis solution effusing from the positive electrode penetrates through the pinholes and cracks to reach the surface of the negative electrode. Then, the electrolysis solution reacts with the negative electrode to cause dendrites to form, causing a short circuit across the electrodes. In addition, when the current capacity per unit area is increased, the stress caused by the volume change of the negative electrode at the time of charge and discharge may fracture the electrolytic layer. If the thickness is more than 22 μm, the resistance of the electrolytic layer against the ionic conduction increases, posing a problem in that the current capacity per unit area cannot be sufficiently increased, so that the efficiency is decreased.

Positive Electrode

<Material>

It is desirable that the material for the positive electrode be made of an organic high-polymeric binder that contains an active material. It is desirable that the binder be at least one type selected from the group consisting of polyacrylonitrile, polyethylene oxide, and polyvinylidene fluoride, all of which contain an organic solvent such as ethylene carbonate, propylene carbonate, or dimethyl carbonate. It is desirable that the active material be at least one type selected from the group consisting of $Li_xCoO_2$, $Li_xMn_2O_4$, and $Li_xNiO_2$ (where 0 <X<1). In addition, It is desirable that a carbon powder be mixed into the high polymer in order to give electronic conductivity.

The organic high polymer in the material for the positive electrode may be a disulfide-family high polymer or polypyrrole-family material all of which contain polyaniline that has not only ionic conductivity but also electronic conductivity.

Regardless of a high polymer selected from the foregoing group, it is important to add either $LiPF_6$ or $LiCF_3SO_3$, a lithium salt. This addition gives good contact between the electrolytic layer and the positive electrode. This good contact considerably reduces the interfacial resistance between the inorganic solid electrolytic layer and the positive electrode (the interfacial resistance has been a serious problem in the case of an inorganic solid electrolytic layer). As a result, the output current can be increased. Moreover, the following drawbacks are significantly improved (these drawbacks have also been a serious problem): gas evolution, a development of over voltage at the time of charging caused by the high internal resistance, and considerable deterioration in battery performance when left under charged condition.

When a powder of an inorganic solid electrolyte having lithium-ion conductivity is added to the positive electrode, the amount of the organic electrolysis solution can be further reduced, thereby lessening the problems caused by the organic electrolysis solution. It is desirable that the inorganic solid electrolyte be the foregoing highly ion-conductive material. Nevertheless, any material having an ionic conductivity of $10^{-3}$ S/cm or more may be used.

<Organic Electrolysis Solution in Positive Electrode>

It is difficult to eliminate an organic electrolysis solution completely in terms of the practical aspect of battery performance. However, it is possible to obtain a high-performance battery by combining the following measures:

(a) an organic electrolysis solution is contained mainly around the active material in the positive electrode;

(b) metallic lithium is used as the negative electrode; and (c) an inorganic film having lithium-ion conductivity is formed on the negative electrode.

This type of lithium secondary battery has the following advantages:

(a) reduction in the amount of the organic electrolysis solution;

(b) suppression of the growth of metallic-lithium dendrites on the negative electrode;

(c) prevention of the contact with the positive electrode and suppression of the reaction with the electrolysis solution, both resulting from the covering effect on the surface of the negative electrode.

The mechanism of gas evolution caused by the organic electrolysis solution is yet to be clarified. Nonetheless, when an organic electrolysis solution is used, the battery constitution of the present invention can reduce the amount of the organic electrolysis solution to no more than 10% of the conventional amount. In this case, the present inventors also found that even when the battery is left under a charged condition, the considerable reduction in the battery performance caused by the decomposition and deterioration of the electrolysis solution can be significantly suppressed (this considerable performance deterioration phenomenon has been experienced in conventional batteries).

When pinholes and cracks are formed in the inorganic solid electrolytic layer, the metallic lithium grows concentratedly along these portions at the time of charging, readily resulting in an internal short circuit. Even when these pinholes and cracks are formed, however, the stabilized charge and discharge performance and safety can be achieved by adjusting the organic electrolysis solution contained in the positive electrode. This adjusting method is explained below.

First, the ionic conductivity of the organic electrolysis solution is reduced to a value equal to or lower than that of the inorganic solid electrolytic layer. This condition has the following effect: Even when pinholes and cracks are formed and the organic electrolysis solution penetrates into these portions to form ionic-conduction paths, Li ions travel mainly through the inorganic solid electrolytic layer that has higher ionic conductivity. As a result, the supply of Li ions into the pinholes and cracks is reduced, thereby suppressing the growth of metallic lithium. As a matter of course, an organic electrolysis solution that has a lower lithium-ion conductivity than that of the inorganic solid electrolytic layer may be used. As an alternative, the organic electrolysis solution in the positive electrode may come into contact with the lithium-containing material of the negative electrode in order to reduce the ionic conductivity of the organic electrolysis solution in the vicinity of the contact portion to a lower value than that of the inorganic solid electrolytic layer.

There are various methods to reduce the ionic conductivity of the organic electrolysis solution. For instance, the amount of the solute as the electrolyte may be reduced. A solvent that has high viscosity and remains low in ionic conductivity, such as sulfolane (tetrahydrothiophene 1,1-dioxide), may also be used.

Second, an organic electrolysis solution is used which contains an organic solvent that is reduced and decomposed when the organic electrolysis solution comes into contact with the metallic lithium. This condition has the following effect: When the organic solvent is reduced and decomposed, a part of it gasifies so that Li ion-travelling paths in the pinholes and cracks are blocked and, at the same time, the ionic conductivity is reduced. To be specific, a carboxylic ester family, such as methyl formate, is effective as the organic solvent.

Third, when an organic electrolysis solution comes into contact with metallic lithium, an organic solvent in the organic electrolysis solution polymerizes by the catalytic action or polymerization-starting action of the metallic lithium. Then, the polymer solidifies or becomes highly viscous to reduce the Li-ion conductivity. In addition, the mechanical action of the formed polymer or highly viscous body suppresses the growth of the metallic lithium. In this case, even if the inorganic solid electrolytic layer separates from the metallic lithium, the organic electrolysis solution effuses and the resultant high polymer or highly viscous body covers pinholes and cracks at the surface of the metallic lithium at all times. This enables the formation of an extremely safe battery.

The types of organic solvents that solidify or become highly viscous when they come into contact with metallic lithium include anionically polymerized monomers having olefinic linkage, such as styrene, acrylonitrile, methyl acrylate, butadiene, and isoprene. A material that contains the foregoing anionically polymerized monomer may also be used. In addition, a solvent that polymerizes by the action of metallic lithium to solidify or become highly viscous, such as acetonitryle, which has a nitryl group, may also be used as a part or as a whole.

Negative Electrode

<Material>

The types of lithium-containing materials to be used as the negative electrode include not only metallic lithium itself but also lithium alloys. The types of lithium alloys include alloys with such elements as In, Ti, Zn, Bi, and Sn.

A layer of a metal that forms an alloy or intermetallic compound with lithium, such as Al, In, Bi, Zn, or Pb, may also be formed on the surface of the foregoing lithium-containing material. The negative electrode comprising the metal layer and the lithium-containing material enables the smooth movement of the metallic lithium at the time of charge and discharge, increasing the utilized thickness of the metallic lithium. It can also equalize the dimension change of the negative electrode at the time of charge and discharge, reducing the stress given to the electrolytic layer. This is attributable to the interface being stabilized with the electrolytic layer. When the negative electrode has a multilayer or a graded structure in composition, it achieves smooth movement of the metallic lithium and reduced stress given to the electrolytic layer. The metal such as Al, In, Bi, Zn, or Pb, which is relatively stable against the air, covers the negative electrode that acts as the substrate when the electrolytic layer is formed. This can stabilize the production and simplify the process.

The foregoing lithium-containing material may be used without any pretreatment when the electrolytic layer is formed. Generally, however, a metal that contains lithium has a thin oxide layer formed on its surface in many instances. Therefore, it is desirable to remove this oxide layer before forming a nitride or sulfide layer. This enables direct formation of the electrolytic layer onto the lithium-containing material, so that the contact resistance between the lithium-containing material and the inorganic solid electrolytic layer can be further reduced. The oxide layer can be removed by the argon plasma treatment. The nitride and sulfide can be formed by exposing the surface of the lithium-containing material to high-frequency plasma in an atmosphere of nitrogen gas or hydrogen sulfide. However, the formation is not limited to solely this method. The removal of an oxide layer and formation of a sulfide layer on the surface of the metallic lithium can also be achieved by heating the metallic lithium at the temperature of its melting point or higher after the metallic-lithium layer is formed.

<Surface Roughness>

Surface roughness (Rmax) of the negative electrode, also, affects the battery performance considerably. It is desirable that the value of Rmax be not less than 0.01 $\mu$m and not more than 5 $\mu$m. If less than 0.01 $\mu$m, good bonding with the electrolytic layer cannot be obtained, resulting in easy separation. In addition, smooth deposition and ionization of the metallic lithium may not be performed at the time of charge and discharge. It appears that the deposition and ionization are affected by the bonding with the electrolytic layer. If Rmax is more than 5 $\mu$m, it becomes difficult to form a pinhole-free, dense electrolytic layer.

<Shape and Structure of Battery>

A battery comprising the foregoing positive electrode, negative electrode, and electrolytic layer has a laminated structure in which the electrolytic layer is sandwiched between the positive and negative electrodes. The laminated body is housed in a battery case to be sealed. To elaborate further, first, the negative electrode-side collector and the negative electrode are bonded. An inorganic solid electrolytic layer without containing an organic electrolysis solution is formed on a lithium-containing material to be used as the negative electrode. Thus, a bonded body of the negative electrode and the electrolytic layer is produced. Second, a material containing an organic high polymer is formed on a positive electrode-side collector (copper or aluminum foil, for example) to obtain the positive electrode. Finally, the bonded body of the negative electrode and electrolytic layer is coupled with the positive electrode to complete a lithium secondary battery. This structure enables the reduction of contact resistance between the negative electrode and electrolytic layer and between the positive electrode and electrolytic layer, so that a favorable charge and discharge performance can be obtained. In addition to the laminated button-type battery described above, a laminated body of the negative electrode, electrolytic layer, and positive electrode may be rolled up to obtain a cylindrically shaped battery.

A separator may be placed between the positive electrode and the inorganic solid electrolytic layer. The material for the separator must have pores in which lithium ions can travel and to be stable without dissolving into an organic electrolysis solution. For instance, a nonwoven fabric or porous body formed of polypropylene, polyethylene, fluororesin, polyamide resin and so on may be used. A metal oxide film having pores may also be used.

It is not always required to provide a lithium-containing material as the negative electrode in advance. An inorganic solid electrolytic layer may be formed directly on the negative electrode-side collector to obtain a lithium secondary battery having sufficient performance. This is because the positive electrode contains a sufficient amount of lithium so that metallic lithium can be stored between the negative electrode-side collector and the inorganic solid electrolytic layer at the time of charging.

SIMPLE EXPLANATION OF THE DRAWING

FIG. 1 is an enlarged cross section of the main part of the lithium secondary battery produced in Example 4-1.

BEST MODE FOR CARRYING OUT THE INVENTION

An explanation of the embodiments of the present invention is given below. EXAMPLE 1-1

This example shows an example of an inorganic solid electrolytic layer and a positive electrode that contains an organic high polymer to confirm the effect of the present invention.

A sheet of copper foil, 100 $\mu$m in thickness and 100×50 mm in size, to be used as the collector was laminated with a sheet of metallic-lithium foil as the negative electrode having a thickness of 50 $\mu$m and the same size as the copper foil. The lamination may be performed by rolling with a twin-roll process. In this case, it is necessary to reduce the surface roughness of the roll to an extent that the intended surface roughness of the metallic-lithium foil can be achieved. Good bonding between the two materials may also be obtained by raising the temperature up to the melting point of metallic lithium or so. The surface roughness of the metallic-lithium foil was Rmax=0.1 $\mu$m when measured under a scanning tunneling microscope (STM).

An inorganic solid electrolytic layer was formed on the metallic lithium by the RF magnetron sputtering method with a target of an $Li_2S$-$SiS_2$-$Li_4SiO_4$ mixture in a nitrogen gas atmosphere. The layer had a thickness of 10 $\mu$m. An electron probe microanalyzer (EPMA) showed the composition of the layer to be Li (0.42): Si (0.13): N (0.01): O (0.01): S (0.43) in mole ratio. An X-ray diffraction result showed only a halo pattern, indicating an amorphous state.

Next, an electrolyte, $LiPF_6$, was dissolved into a mixed liquid of ethylene carbonate (EC) and propylene carbonate (PC). Then, the mixed liquid was heated to dissolve the high concentrated polyacrylonitrile (PAN). The mixed liquid was cooled down to obtain a gelatinous electrolyte comprising $LiPF_6$, EC, PC, and PAN. A powder of $LiCoO_2$ to be used as an active material and a carbon powder that gives electronic conductivity were mixed into the gelatinous electrolyte. Finally, the gelatinous electrolyte was applied onto a sheet of aluminum foil, 100 $\mu$m in thickness, to obtain a positive electrode. The layer of the gelatinous electrolyte had a thickness of 300 $\mu$m.

The metallic lithium on which an inorganic solid electrolytic layer is formed was coupled with the foregoing positive electrode to produce a battery. The battery was provided with lead wires and sealed in an aluminum-laminated envelope.

The charge and discharge performance was evaluated under a condition of 100 mA in electric current. The result showed that the capacity was 0.5 Ah (ampere hour) at a charged voltage of 4.2 V and a discharged voltage of 3.0 V. The energy density was 490 Wh (watt hour)/l(liter).

When the charge and discharge cycle was repeated 1,000 times under the same condition as above, these characteristic values decreased no more than 2%, there was no vestige of the growth of dendrites from the metallic lithium of the negative electrode, and there was no gas evolution. In short, the battery showed excellent stability.

When $LiCoO_2$ or $Li_xNiO_2$ was used as the active material in the positive electrode, nearly the same results were obtained. When polyethylene oxide or polyvinylidene fluoride was used as the material in the positive electrode, similar satisfactory results were obtained. When propylene carbonate or dimethyl carbonate each of which contains $LiBF_4$, $LiClO_4$, or $LiCF_3SO_3$ was used as the electrolyte, similar results were obtained.

EXAMPLE 1-2

In the battery constitution shown in Example 1-1, a disulfide-family high polymer containing polyaniline was used as the material for the positive electrode in place of the PAN-family material. A mixture of particles having a particle-diameter range of 0.1 to 0.5 $\mu$m was mixed into the high-polymer material. The amount of the mixture was 10 vol. %. The mixture had a constitution ratio of Li (0.42): Si (0.13): O (0.01): S (0.44). The mixture of particles was prepared by atomizing and rapidly solidifying a mixed molten body of $Li_2S$, $SiS_2$, and $Li_4SiO_4$ by the atomizing method in an atmosphere of dried nitrogen gas. The positive electrode had a thickness of 350 $\mu$m.

The charge and discharge performance of the produced battery was evaluated. With a charged voltage of 4.2 V, when the battery was discharged at a rate of 50 mA, it showed a current capacity of 0.49 Ah when the terminal voltage decreased to 3.0 V. The energy density was 400 Wh/l. When the charge and discharge cycle was repeated 1,000 times under the same condition as before, these characteristic values decreased no more than 2%, there was no vestige of the growth of dendrites from the metallic lithium of the negative electrode, and there was no gas evolution. In short, the battery showed excellent stability.

EXAMPLE 1-3

In the battery constitution shown in Example 1-1, the thickness of the positive electrode, electrolyte, and negative electrode was changed to evaluate the charge and discharge performance. The results of the evaluation are shown in Table 1. As can be seen in Table 1, when the thickness of the electrode layer is increased, the output per unit area is increased. However, the time needed for charging is also increased at the same time, decreasing the practicality significantly. Therefore, it is desirable that the positive electrode have a thickness not lass than 2 $\mu$m and not more than 1,000 $\mu$m, the negative electrode not less and not more than 200 $\mu$m, and the electrolyte layer not less than not more than 50 $\mu$m.

TABLE 1

| Thickness of negative electrode ($\mu$m) | Thickness of electrolytic layer ($\mu$m) | Thickness of positive electrode ($\mu$m) | Density of current capacity (Ah/cm$^2$) | Time needed for charging (h) | Result of charge/discharge cycle test (1,000 cycles) |
|---|---|---|---|---|---|
| 0.1 | 10 | 0.2 | 0.02 | 0.004 | |
| 1 | 10 | 2 | 0.2 | 0.04 | |
| 10 | 10 | 20 | 2 | 0.4 | |
| 100 | 10 | 400 | 20 | 4 | |
| 500 | 10 | 1,500 | 100 | 20 | |
| 50 | 0.04 | 300 | 10 | | Short-circuited at 300 cycles |
| 50 | 1 | 300 | 10 | | Stable |
| 50 | 10 | 300 | 10 | | Stable |
| 50 | 50 | 300 | 10 | | Stable |
| 50 | 100 | 300 | 10 | | Stable |

EXAMPLE 1-4

In the battery constitution shown in Example 1-1, the surface roughness of negative electrode was changed to evaluate the charge and discharge performance. The results of the evaluation are shown in Table 2. As can be seen in Table 2, the surface roughness affects the quality of the electrolytic layer formed on the negative electrode. Specifically, when the surface roughness exceeded 5 $\mu$m, the electrolytic layer generated pinholes and a short circuit occurred when the charge and discharge cycles were repeated 300 times.

TABLE 2

| Surface roughness of negative electrode (Rmax/$\mu$m) | Thickness of electrolytic layer ($\mu$m) | Presence or absence of pinholes in electrolytic layer | Result of charge/discharge cycle test (1,000 cycles) |
|---|---|---|---|
| 0.001 | 10 | Absent | Stable |
| 0.005 | 10 | Absent | Stable |
| 0.01 | 10 | Absent | Stable |
| 0.1 | 10 | Absent | Stable |
| 1 | 10 | Absent | Stable |

TABLE 2-continued

| Surface roughness of negative electrode (Rmax/μm) | Thickness of electrolytic layer (μm) | Presence or absence of pinholes in electrolytic layer | Result of charge/discharge cycle test (1,000 cycles) |
| --- | --- | --- | --- |
| 3 | 10 | Absent | Stable |
| 5 | 10 | Absent | Stable |
| 7 | 60 | Present | Short-circuited at 300 cycles |

Example 1-5

In the battery constitution shown in Example 1-2, the metallic-lithium foil of the negative electrode was replaced by a lithium-indium alloy. The surface of the lithium-indium alloy was previously nitrided to form a nitride layer. Then, an inorganic solid electrolytic layer was formed by a method similar to the previous method to complete a battery. Observation and analysis through a transmission electron microscope (TEM) and other instruments revealed that the nitride layer has a composition of $Li_3N$ and a thickness of about 100 Å. The nitride layer was obtained by exposing the surface of the lithium-indium alloy to RF plasma in a nitrogen atmosphere before the inorganic solid electrolytic layer was formed.

The charge and discharge performance of the produced battery was evaluated. With a charged voltage of 4.2 V, even when the battery was discharged at a rate as high as 200 μmA, it showed a current capacity as high as 0.49 Ah before the terminal voltage decreased to 3.0 V. The energy density was 400 Wh/l. When the charge and discharge cycle was repeated 1,000 times under the same condition as before, these characteristic values decreased no more than 3% and there was no vestige of the growth of dendrites from the metallic lithium of the negative electrode.

EXAMPLE 2-1

This example demonstrates the effect of a dual-layer structure of the inorganic solid electrolytic layer in which a film of lithium ion-conductive compound containing sulfide and a film of lithium ion-conductive compound containing oxide are laminated.

A collector made of a sheet of copper foil having a thickness of 20 μm and a size of 100×50 mm was laminated with a sheet of metallic-lithium foil (negative electrode) having a thickness of 10 μm and the same size as the collector to produce a substrate. A film of lithium ion-conductive compound containing sulfide was formed on the surface of the metallic-lithium foil. Subsequently, a film of lithium ion-conductive compound containing oxide was laminated on the sulfide-containing film to complete the electrolytic layer having a dual-layer structure. The electrolytic layer was formed by the in-line type RF magnetron sputtering method.

The film of lithium ion-conductive compound containing sulfide was formed with a target of an $Li_2S$-$SiS_2$ mixture in an argon gas atmosphere. The sulfidecontaining film had a thickness of 10 μm. An electron probe microanalyzer (EPMA) showed the composition of the film to be Li: Si: S=0.42: 0.13: 0.45 in mole ratio. An X-ray diffraction result showed only a halo pattern, indicating an amorphous state.

The film of lithium ion-conductive compound containing oxide was formed on the film of lithium ion-conductive compound containing sulfide with a target of $Li_3PO_4$ in a nitrogen gas atmosphere. The oxide-containing film had a thickness of 1 μm.

When the negative electrode and electrolytic layer were left in the air for six hours, the sulfide layer showed no change in composition, demonstrating its excellent stability. Moreover, the ionic conductivity showed satisfactory performance without decreasing the high ionic conductivity of the sulfide layer.

Next, an electrolyte, $LiPF_6$, was dissolved into a mixed liquid of ethylene carbonate (EC) and propylene carbonate (PC). Then, the mixed liquid was heated to dissolve the high concentrated polyacrylonitrile (PAN). The mixed liquid was cooled down to obtain a gelatinous electrolyte comprising $LiPF_6$, EC, PC, and PAN. A powder of $LiCoO_2$ to be used as an active material and a carbon powder that gives electronic conductivity were mixed into the gelatinous electrolyte. Finally, the gelatinous electrolyte was applied onto a sheet of aluminum foil, 20 μm in thickness, to obtain a positive electrode. The layer of the gelatinous electrolyte had a thickness of 300 μm. The foregoing laminated body of the negative electrode and electrolytic layer was coupled with the positive electrode to produce a battery. The battery was subjected to a performance test.

When the battery charged with a voltage of 4.2 V, was discharged at a rate of 100 μmA, it showed a current capacity of 0.5 Ah before the terminal voltage decreased to 3.0 V. The energy density was 490 Wh/l. When the charge and discharge cycle was repeated 1,000 times under the same condition as before, these characteristic values decreased no more than 2%, there was no vestige of the growth of dendrites from the metallic lithium of the negative electrode, and there was no gas evolution. In short, the battery showed excellent stability.

COMPARATIVE EXAMPLE 2-1

In the battery constitution shown in Example 2-1, the thickness of the film of lithium ion-conductive compound sulfide was changed to 0.5 μm and the thickness of the film of lithium ion-conductive compound containing oxide was changed to 5 μm. Because the oxide-containing layer was excessively thicker than the sulfide-containing layer, the ionic conductivity decreased drastically, so that the battery failed to show the targeted performance.

EXAMPLE 2-2

In the battery constitution shown in Example 2-1, a lithium titanate-family amorphous body having a thickness of 1.8 μm was used as the film of lithium ion-conductive compound containing oxide. A battery was produced without changing components other than the foregoing material. The test results of the battery performance were satisfactory.

EXAMPLE 2-3

In the battery constitution shown in Example 2-1, a lithium phosphate-family amorphous body was used as the film of the lithium ion-conductive compound containing oxide and the thickness of the sulfide-containing layer and oxide-containing layer was changed to different values to evaluate the performance of these batteries. The results of the test are shown in Table 3. In the column of "Battery performance" in Table 3, the mark "⊚" indicates that the battery was stable in performance after 1,000 cycles or more, the mark "○" indicates that the battery was stable in performance after 500 cycles or more, "X" shows that the battery showed a 5% or more reduction in performance after less than 500 cycles.

TABLE 3

| Thickness of sulfur-containing layer (μm) | Thickness of oxide-containing layer (μm) | Battery performance |
|---|---|---|
| 2 | 0.1 | ◎ |
| 10 | 1 | ◎ |
| 15 | 1.7 | ◎ |
| 20 | 1.5 | ◎ |
| 10 | 2 | ◎ |
| 10 | 0.05 | ○ |
| 10 | 2.5 | ○ |
| 1 | 2.5 | x |
| 0.5 | 1 | x |
| 0.5 | 2.5 | x |

A sheet of metallic-lithium foil having a thickness of 50 μm was laminated with a sheet of metallic-indium foil having a thickness of 5 μm by a twin-roll process to produce the negative electrode. An analysis showed that the interfacial portion of the lithium and indium layers has mutual diffusion and a graded structure in composition and that the surface portion is elemental indium.

A battery was produced by forming an electrolytic layer with the method described in Examples 1-1 to 1-5 on the negative electrode as the substrate. A charge and discharge test was carried out under the condition of 1 mA/cm² (milliampere/square centimeter). The current capacity was 20 mAh/cm² (milliampere hour/square centimeter). Nearly all the metallic lithium including the lithium ions existing in the positive electrode was utilized for the charge and discharge. When charge and discharge cycles were repeated up to 1,000 cycles under the same condition as above, the charge and discharge curve was stable without showing a notable change. There were no generation of dendrites and no other abnormalities.

EXAMPLE 3-1

In this example, a completed battery was folded to generate cracks on the inorganic solid electrolytic layer. Then, the charge and discharge performance was examined.

A sheet of ferrite stainless-steel foil (the negative electrode-side collector), 20 μm in thickness and 100×50 mm in size, was laminated with a sheet of metallic-lithium foil (the negative electrode) having a thickness of 10 μm and the same size as the stainless-steel foil. The lamination was performed by rolling between rolls.

An inorganic solid electrolytic layer was formed on the metallic-lithium foil by the laser abrasion method with a target of an $Li_2S$-$SiS_2$-$Li_4SiO_4$ mixture in an argon gas atmosphere. The layer had a thickness of 10 μm. The result of analysis by an EPMA showed the composition of the layer to be Li:Si:O:=0.42:0.13:0.02:0.43 in mole ratio. An X-ray diffraction result showed only a halo pattern, indicating an amorphous state. The inorganic solid electrolytic layer had a lithium-ion conductivity of $1 \times 10^{-3}$ S/cm (at room temperature; the same shall apply hereinafter).

A vinylidene fluoride monomer, acetonitrile, $LiPF_6$, an $LiCoO_2$ powder, and a carbon powder as a conducting agent were mixed. A polymerization-starting agent (oxygen-added triisobutylboron) was mixed into the foregoing mixture. The final mixture was applied onto a sheet of aluminum foil (the positive electrode-side collector) having a thickness of 20 μm. The applied mixture, 100 μm in thickness, was polymerized to obtain a gelled positive electrode. The organic electrolysis solution in the positive electrode had a lithium ion-conductivity of $5 \times 10^{-2}$ S/cm.

The metallic-lithium foil having an inorganic solid electrolytic layer formed on it was coupled with the foregoing positive electrode to produce a battery. The battery was provided with lead wires and sealed in an aluminum-laminated envelope.

A charge and discharge-performance evaluation test and a crack test were carried out on the completed battery. In the crack test, a completed battery was folded to generate cracks on the inorganic solid electrolytic layer. Then, the charge and discharge performance was examined to observe the performance change.

The result of the ordinary charge and discharge-performance test demonstrated that the battery of this example showed nearly 100% current efficiency in the charge and discharge curve. As opposed to this, charge and discharge curves obtained on the conventional batteries have shown a decrease in current efficiency (down to 80%) presumably because of weak internal leakage caused by pinholes in the inorganic solid electrolytic layer.

The result of the crack test showed no internal short circuit. Practically no decrease in current efficiency was observed in the test. For comparison, a mixed solvent of propylene carbonate and dimethyl carbonate was used as the organic solvent to produce a battery with a method similar to the method described above. A crack test on this battery revealed that the charging was impossible, because the terminal voltage scarcely rose at the time of charging. This is attributable to an internal short circuit.

When $Li_xMn_2O_4$ or $Li_xNiO_2$ was used as the active material in the positive electrode, a similar result was obtained. When polyethylene oxide or polyacrylonitrile was used as the material in the positive electrode, a similar satisfactory result was obtained. When $LiBF_4$, $LiClO_4$, or $LiCF_3SO_3$ was used as the electrolyte, a satisfactory result was obtained.

EXAMPLE 3-2

In the battery constitution shown in Example 3-1, acetonitrile was replaced by an N, N-dimethylformamide (DMF) solvent that contains acrylonitrile. The organic electrolysis solution having this solvent showed a lithium ion-conductivity of $2 \times 10^{-2}$ S/cm.

As with Example 3-1, a charge and discharge-performance evaluation test and a crack test were carried out. The results were satisfactory. When styrene, ester acrylate, methacrylonitrile, ester methacrylate, a butadiene derivative, or an isoprene derivative was used, the result was satisfactory.

EXAMPLE 3-3

In the battery constitution shown in Example 3-1, the quantity of the solute in the organic electrolysis solution was reduced to 25% of the ordinary quantity. With this reduced quantity, a lithium secondary battery was produced as with Example 3-1. The resultant lithium ion-conductivity was reduced to $5 \times 10^{-4}$ S/cm.

A charge and discharge-performance test and a crack test were carried out on the completed battery. The obtained current efficiency was not less than 95% in the charge and discharge curve. In the crack test, a slight decrease in current efficiency was observed. It can be said, however, the battery scarcely lost its performance. In a 500-time charge and discharge cycle test, the battery having the constitution of this example demonstrated satisfactory performance scarcely showing a decrease in properties. In this test, conventional batteries have shown a decrease in current efficiency presumably because of cracks in the inorganic solid electrolytic layer generated by the charge and discharge cycles.

EXAMPLE 3-4

In the battery constitution shown in Example 3-1, a separator was provided between the negative electrode and positive electrode and acetonitrile was replaced by methylsulfolane to produce a lithium secondary battery with a method similar to that in Example 3-1. The organic electrolysis solution having the foregoing solvent had a lithium ion-conductivity of $7 \times 10^{-4}$ S/cm in the separator. The battery showed satisfactory performance similar to that obtained in Examples 1-1 to 1-5. The charge and discharge performance was also satisfactory.

EXAMPLE 3-5

In the battery constitution shown in Example 3–, acetonitrile was replaced by methyl formate to produce a lithium secondary battery with a method similar to that in Example 3-1. The organic electrolysis solution having the foregoing solvent had a lithium ion-conductivity of $1 \times 10^{-3}$ S/cm. The battery showed satisfactory performance similar to that obtained in Example 3-1. The charge and discharge performance was also satisfactory.

EXAMPLE 4-1

This is an example in which a separator is used. An explanation is given by using FIG. 1, which is an enlarged cross section of the main part of the lithium secondary battery produced in this example.

The negative electrode was produced by laminating a sheet of metallic lithium 5 having a thickness of 200 $\mu$m with a collector 6 made of a sheet of metallic nickel having a diameter of one inch. An inorganic solid electrolytic layer 4 was formed on the negative electrode by the RF magnetron sputtering method with a target of a mixture of $Li_2S$, $P_2S_5$, and $Li_3PO_4$. The result of analysis showed that the inorganic solid electrolytic layer 4 is an amorphous body composed of lithium (34 atm. %), phosphorus (14 atm. %), sulfur (51 atm. %), and oxygen (1 atm. %). The layer had a thickness of 800 nm.

The amorphous film had a lithium ion-conductivity of $7 \times 10^{-4}$ S/cm. The ionic conductivity was measured by the complex impedance method on a specimen produced by forming the amorphous layer on a comb-shaped gold electrode that was formed on a glass substrate free from alkali ions.

A powder of $LiCoO_2$ to be used as the active material, a carbon powder that gives electronic conductivity, and polyvinylidene fluoride were mixed together with an organic solvent. The mixture was applied onto a sheet of aluminum foil to produce a positive electrode 2. The active-material layer had a thickness of 80 $\mu$m, a current-capacity density of 3.5 mAh/cm$^2$, and a total capacity of 17.2 mAh.

The negative electrode with the inorganic solid electrolytic layer formed on it, a separator 3 (a porous polymer film), and the positive electrode 2 were placed one upon another in a stainless-steel hermetically sealable container in an argon gas atmosphere having a dew point not higher than -60° C. An electrolytic salt, 1 $\mu$mol. % $LiPF_6$, was dissolved in a mixed solution of ethylene carbonate and propylene carbonate to produce an organic electrolysis solution. The organic electrolysis solution was dropped onto the foregoing piled components to produce a lithium secondary battery. The stainless steel acted as a positive electrode-side collector 1.

A charge and discharge-cycle test was carried out at a constant current of 8.6 mA between a charged voltage of 4.2 V and a discharged voltage of 3.0 V. The results of the cycle test are shown in Table 4. No internal short circuits were caused and no reductions in capacity were observed after the completion of 500 cycles.

EXAMPLES 4-2 to 4-10

In the battery constitution shown in Example 4-1, the composition and ionic conductivity of the inorganic solid electrolytic layer were changed for experimentation. Addition and content adjustment of the nitrogen atoms in the inorganic solid electrolytic layer were performed by adjusting the nitrogen-gas concentration in the introduced gas in the RF magnetron sputtering process. The charge and discharge-cycle performance of the produced batteries was examined under the same conditions as in Example 4-1. The results are also shown in Table 4.

COMPARATIVE EXAMPLES 4-1 to 4-5

In the battery constitution shown in Example 4–1, the inorganic solid electrolytic layer formed on the metallic-lithium negative electrode was removed for comparative experimentation. A charge and discharge-cycle test was carried out under the same conditions as in Example 4-1. The results are shown in the row "Comparative Example 4-1" in Table 4. The current efficiency was as low as in the order of 90% from the beginning of the charge and discharge. When the number of cycles exceeds 78, a voltage drop attributable to minute internal short circuits became measurable and the capacity further decreased considerably.

The composition and ionic conductivity of the inorganic solid electrolytic layer were changed for another type of comparative experiment. Charge and discharge-cycle tests were carried out on the produced batteries under the same conditions as in Example 4-1. The results are also shown in Table 4. As can be seen in the table, Comparative Examples 4-2 to 4-5 showed unsatisfactory charge and discharge-cycle performance.

TABLE 4

Effect of Composition and Ionic Conductivity of Inorganic Solid Electrolytic Layer on Charge/Discharge Cycle Performance of Batteries

|  |  | Composition of inorganic solid electrolytic layer (atm. %) (Blank means 0 atm. %.) | | | | | | | | | Ionic conductivity of inorganic solid electrolytic layer (S/cm) | Charge/discharge cycle performance of battery |
| --- | --- | --- | --- | --- | --- | --- | --- | --- | --- | --- | --- | --- |
|  |  | Li | P | Si | B | Al | Ge | Ga | S | N | O |  |  |
| Example | 4-1 | 34 | 14 |  |  |  |  |  | 51 |  | 1 | $7 \times 10^{-4}$ | Not less than 500 cycles |
|  | 4-2 | 38 | 12 |  |  |  |  |  | 49 |  | 1 | $1 \times 10^{-3}$ | Not less than 500 cycles |
|  | 4-3 | 64 | 1 |  |  |  |  |  | 33 |  | 2 | $5 \times 10^{-4}$ | Not less than 500 cycles |
|  | 4-4 | 50 | 1 |  |  |  | 8 |  | 40 | 1 |  | $1 \times 10^{-3}$ | Not less than 500 cycles |
|  | 4-5 | 42 |  | 13 |  |  |  |  | 43 | 1 | 1 | $2 \times 10^{-3}$ | Not less than 500 cycles |
|  | 4-6 | 30 |  |  | 22 |  |  |  | 47 |  | 1 | $5 \times 10^{-5}$ | Not less than 500 cycles |
|  | 4-7 | 44 | 1 |  |  |  |  | 11 | 42 | 1 | 1 | $5 \times 10^{-3}$ | Not less than 500 cycles |
|  | 4-8 | 43 |  |  |  | 7 |  | 7 | 42 |  | 1 | $1 \times 10^{-3}$ | Not less than 500 cycles |

TABLE 4-continued

Effect of Composition and Ionic Conductivity of Inorganic Solid Electrolytic Layer on Charge/Discharge Cycle Performance of Batteries

| | | Composition of inorganic solid electrolytic layer (atm. %) (Blank means 0 atm. %.) | | | | | | | | | Ionic conductivity of inorganic solid electrolytic layer | Charge/discharge cycle |
|---|---|---|---|---|---|---|---|---|---|---|---|---|
| | | Li | P | Si | B | Al | Ge | Ga | S | N | O | (S/cm) | performance of battery |
| | 4-9 | 31 | 1 | 7 | | | 10 | | 50 | | 1 | $1 \times 10^{-4}$ | Not less than 500 cycles |
| | 4-10 | 42 | | 12 | | | | | 46 | | | $7 \times 10^{-5}$ | Not less than 500 cycles |
| Comparative | 4-1 | — | — | — | — | — | — | — | — | — | — | — | 78 |
| Example | 4-2 | 21 | 20 | | | | | | 59 | | 1 | $8 \times 10^{-6}$ | 101 |
| | 4-3 | 66 | | 0.3 | | | | | 33.7 | | | $3 \times 10^{-6}$ | 192 |
| | 4-4 | 17 | 4 | | | | | 20 | 43 | 16 | | $7 \times 10^{-7}$ | 138 |
| | 4-5 | 29 | | | 29 | | | | 52 | | | $4 \times 10^{-6}$ | 251 |

EXAMPLES 4-11 to 4-15

These examples were carried out to examine the effect of the thickness of the inorganic solid electrolytic layer.

In the battery constitution and composition of the inorganic solid electrolyte in Example 4-1, only the thickness of the inorganic solid electrolytic layer was changed for experimentation. Charge and discharge-cycle tests were carried out on the produced batteries. The results are shown in Table 5. When the inorganic solid electrolytic layer has a thickness in the range of 50 nm to 50 µm, the battery caused no internal short circuit and showed no reduction in capacity after the completion of 500 cycles.

TABLE 5

Effect of Thickness of Inorganic Solid Electrolytic Layer on Battery Performance

| | | Layer thickness | Charge/discharge-cycle performance |
|---|---|---|---|
| Example | 4-11 | 50 nm | Not less than 500 cycles |
| | 4-12 | 100 nm | Not less than 500 cycles |
| | 4-13 | 1.5 µm | Not less than 500 cycles |
| | 4-14 | 35 µm | Not less than 500 cycles |
| | 4-15 | 50 µm | Not less than 500 cycles |
| Comparative | 4-6 | 20 nm | 113 |
| Example | 4-7 | 40 nm | 156 |
| | 4-8 | 60 µm | Not less than 500 cycles (However, current efficiency was 95%.) |

COMPARATIVE EXAMPLES 4-6 to 4-8

In the battery constitution in Example 4-1, only the thickness of the inorganic solid electrolytic layer was changed so as to fall outside the range of the thickness in Examples 4-11 to 4-15. An experiment similar to that in Examples 4-11 to 4-15 was carried out to examine the charge and discharge-cycle performance of the produced batteries. The results are also shown in Table 5. As can be seen in the result of Comparative Example 4-8, when the thickness was 60 µm, the current efficiency showed an insufficient value as low as 95% from the beginning of the charge and discharge cycles. However, the current efficiency showed no change even after the completion of 500 cycles.

EXAMPLES 4-16 to 4-18

In the inorganic solid electrolytic layer having a dual-layer structure, the composition of the positive electrode-side layer made of an amorphous inorganic solid electrolyte was changed to examine the stability of the inorganic solid electrolyte in the air. The battery performance was also examined with a constitution similar to that of the battery explained in Example 4-1. The negative electrode-side inorganic solid electrolytic layer (also amorphous) had the same composition as in Example 4-7. The positive electrode-side and negative electrode-side layers had a thickness of 50 nm and 1 µm, respectively. The obtained results are shown in Table 6. Each of these examples showed excellent stability. The batteries were satisfactory in showing the intended performance. After the completion of 500 cycles, the batteries caused no internal short circuits and showed no decrease in capacity.

TABLE 6

Effect of Composition of Inorganic Solid Electrolytic Layer in Dual-Layer Structure on Battery Performance

| | | Composition of positive electrode-side layer (atm. %) | | | | Stability in air |
|---|---|---|---|---|---|---|
| | | Li | P | O | N | |
| Example | 4-16 | 37.5 | 12.5 | 50 | 0 | No change in one month |
| | 4-17 | 45.5 | 9.8 | 39.4 | 5.3 | No change in one month |
| | 4-18 | 50 | 8.3 | 33.3 | 8.3 | No change in one month |
| Comparative Example | 4-9 | 53.6 | 7.1 | 10.7 | 28.6 | After two hours, color change to white was observed and lithium-ion conductivity reduced. |
| | 4-10 | 27.5 | 22.5 | 50 | 0 | No change in one month; however, current efficiency reduced in charge/discharge test. |

COMPARATIVE EXAMPLES 4-9 and 4-10

In the inorganic solid electrolytic layer having a dual-layer structure, the composition of the positive electrode-side layer made of an amorphous inorganic solid electrolyte was changed from that in Examples 4-16 to 4-18 to examine the stability of the inorganic solid electrolyte in the air. The battery performance was also examined with a constitution similar to that of the battery explained in Example 4-1. The negative electrode-side inorganic solid electrolytic layer (also amorphous) had the same composition as in Example 4-7. The obtained results are also shown in Table 6. Both comparative examples were extremely unstable and their battery performance deteriorated significantly.

EXAMPLES 4-19 and 4-20

In the inorganic solid electrolytic layer having a dual-layer structure, the thickness of the positive electrode-side amorphous inorganic solid electrolytic layer was changed to examine the stability of the inorganic solid electrolyte in the air. The battery performance was also examined with a constitution similar to that of the battery in Example 4-16. The negative electrode-side inorganic solid electrolytic layer (also amorphous) had the same composition as in Example 4-7. The obtained results are shown in Table 7. Both examples showed excellent stability. The batteries were satisfactory in showing the intended performance. After the completion of 500 cycles, the batteries caused no internal short circuits and showed no reduction in capacity.

COMPARATIVE EXAMPLES 4-11 and 4-12

As comparative examples, in the inorganic solid electrolytic layer having a dual-layer structure, the thickness of the positive electrode-side amorphous inorganic solid electrolytic layer was changed so as to fall outside the range of the thickness in Examples 4-19 and 4-20 to examine the stability of the inorganic solid electrolyte in the air. The battery performance was also examined with a constitution similar to that in Example 4-16. The negative electrode-side inorganic solid electrolytic layer (also amorphous) had the same composition as in Example 4-7. The obtained results are also shown in Table 7. Both comparative examples were extremely unstable and their battery performance deteriorated significantly.

TABLE 7

Effect of Thickness of Positive Electrode-Side Inorganic Solid Electrolytic Layer in Dual-Layer Structure on Battery Performance

| | | Thickness of positive electrode-side inorganic solid electrolytic layer | Stability in air |
|---|---|---|---|
| Example | 4-19 | 10 nm | No change in one month |
| | 4-20 | 25 μm | No change in one month |
| Comparative Example | 4-11 | 5 nm | After one hour, color change to white was observed and lithium-ion conductivity reduced. |
| | 4-12 | 30 μm | No change in one month; however, current efficiency reduced in charge/discharge test. |

EXAMPLE 4-21

This example examined the effect of pretreatment of the metallic lithium as the negative electrode.

The surface of the metallic lithium as the negative electrode was presputtered in an argon atmosphere with an RF magnetron-sputtering apparatus to remove an oxide layer unavoidably existing on the surface of the metallic lithium. Then, an inorganic solid electrolytic layer was formed on the surface of the metallic lithium. The electrolytic layer, 2.5 μm in thickness, had a composition of Li (39.4 atm. %), P (0.3 atm. %), B (16.0 atm. %), S (43.3 atm. %), and O (1.1 atm. %). A lithium secondary battery was produced by using the foregoing negative electrode with a battery constitution similar to that in Examples 1-1 to 1-5. The charge and discharge-cycle performance of the battery was examined at a constant current of 17.2 mA. After the completion of 500 cycles, the battery caused no internal short circuit and showed no reduction in capacity.

EXAMPLE 4-22

The surface of the metallic lithium as the negative electrode was presputtered in an atmosphere containing $H_2S$ with an RF magnetron-sputtering apparatus to remove an oxide layer unavoidably existing on the surface of the metallic lithium for forming a lithium sulfide layer concurrently. Then, an inorganic solid electrolytic layer was formed on the surface of the lithium sulfide layer. The electrolytic layer, 10 μm in thickness, had a composition of Li (38.2 atm. %), P (12.2 atm. %), S (48.6 atm. %), and O (1.0 atm. %). A lithium secondary battery was produced by using the foregoing negative electrode with a battery constitution similar to that in Example 4-1. The charge and discharge-cycle performance of the battery was examined at a constant current of 17.2 μmA. After the completion of 500 cycles, the battery caused no internal short circuit and showed no reduction in capacity.

EXAMPLE 4-23

The surface of the metallic lithium as the negative electrode was presputtered in a nitrogen atmosphere with an RF magnetron-sputtering apparatus to remove an oxide layer unavoidably existing on the surface of the metallic lithium for forming a lithium nitride layer concurrently. Then, an inorganic solid electrolytic film was formed on the surface of the lithium nitride layer. The electrolytic layer, 1 μm in thickness, had a composition of Li (42.3 atm. %), P (0.3 atm. %), Si (11.8 atm. %), S (44.3 atm. %), and O (1.3 atm. %). A lithium secondary battery was produced by using the foregoing negative electrode with a battery constitution similar to that in Example 4-1. The charge and discharge-cycle performance of the battery was examined at a constant current of 17.2 μmA. After the completion of 500 cycles, the battery caused no internal short circuit and showed no reduction in capacity.

INDUSTRIAL APPLICABILITY

As is stated above, the present invention enables the suppression of short circuits caused by the generation of dendrites from the metallic-lithium negative electrode. Consequently, the present invention can offer a highly stable and safe lithium secondary battery that has high energy density and excellent charge and discharge-cycle performance.

What is claimed is:

1. A lithium secondary battery comprising an electrolytic layer, a positive electrode, and a negative electrode that is made of a lithium-containing material in which battery:
    (a) the electrolytic layer is made of an inorganic solid electrolyte; and
    (b) the positive electrode contains an organic high polymer, wherein the electrolytic layer contains:
        (a) an Li constituent not less than 30 atm. % and not more than 65 atm. %;
        (b) at least one type of element selected from the group consisting of phosphorous, silicon, boron, germanium, and gallium; and
        (c) sulfur.
2. The lithium secondary battery as defined in claim 1, wherein the electrolytic layer has a lithium-ion conductivity of $1 \times 10^{-5}$ S/cm or more at 25° C.
3. The lithium secondary battery as defined in claim 1, wherein the electrolytic layer has a lithium-ion conductivity of $5 \times 10^{-5}$ S/cm or more at 25° C.
4. The lithium secondary battery as defined in claim 1, wherein the electrolytic layer is made of an amorphous body.
5. The lithium secondary battery as defined in claim 1, wherein the electrolytic layer contains at least one type selected from the group consisting of oxygen, nitrogen, sulfide, and oxynitride.
6. The lithium secondary battery as defined in claim 1, wherein the electrolytic layer contains at least one element selected from the group consisting of oxygen and nitrogen.

7. The lithium secondary battery as defined in claim 1, wherein the organic high polymer contained in the positive electrode is a disulfide-family high polymer containing polyaniline.

8. The lithium secondary battery as defined in claim 1, wherein the organic high polymer contained in the positive electrode contains one type of lithium salt selected from the group consisting of $LiPF_6$ and $LiCF_3SO_3$.

9. The lithium secondary battery as defined in claim 1, wherein the positive electrode contains an organic electrolyte solution.

10. The lithium secondary battery as defined in claim 9, wherein the organic electrolyte solution contained in the positive electrode has a lithium ion-conductivity lower than that of the inorganic solid electrolyte that constitutes the electrolytic layer.

11. The lithium secondary battery as defined in claim 9, wherein the organic electrolyte solution contained in the positive electrode:
   (a) comes into contact with the lithium-containing material that constitutes the negative electrode; and
   (b) thereby reduces the ionic conductivity of the organic electrolyte solution in the vicinity of the contact portion to a value lower than that of the inorganic solid electrolyte.

12. The lithium secondary battery as defined in claim 9, wherein the organic solvent contained in the organic electrolyte solution contained in the positive electrode:
   (a) comes into contact with the lithium-containing material that constitutes the negative electrode; and
   (b) thereby increases the viscosity of the organic electrolyte solution in the vicinity of the contact portion.

13. The lithium secondary battery as defined in claim 9, wherein the organic solvent contained in the organic electrolyte solution contained in the positive electrode contains a sulfolane-family compound.

14. The lithium secondary battery as defined in claim 9, wherein the organic solvent contained in the organic electrolyte solution contained in the positive electrode contains a chain carboxylic ester family.

15. The lithium secondary battery as defined in claim 1, wherein the negative electrode has a surface roughness not less than 0.01 $\mu$m and not more than 5 $\mu$m in the value of Rmax.

16. A lithium secondary battery comprising an electroytic layer, a positive electrode, and a negative electrode that is made of a lithium-containing material, in which battery:
   (a) the electrolytic layer is made of an inorganic solid electrolyte; and
   (b) the positive electrode contains an organic high polymer, wherein the electrolytic layer contains at least one type selected from the group consisting of oxygen, nitrogen, sulfide, and oxynitride; and
      (a) the sulfide is composed of at least one type selected from the group consisting of $Li_2S$, a compound between $Li_2S$ and $SiS_2$, a compound between $Li_2S$ and $GeS_2$, and a compound between
      (b) the oxynitiride is composed of at least one type selected from the group consisting of $Li_3PO_{4-x}N_{2x/3}$, $Li_4SiO_{4-x}N_{2x/3}$, $Li_4GeO_{4-x}N_{2x/3}$ (where 0<X<4), and $Li_3BO_{3-x}N_{2x/3}$ (where 0<X<3).

17. A lithium secondary battery comprising an electroytic layer, a positive electrode, and a negative electrode that is made of a lithium-containing material, in which battery:
   (a) the electrolytic layer is made of an inorganic solid electrolyte; and
   (b) the positive electrode contains an organic high polymer, wherein the electrolytic layer has a thickness not less than 50 nm and not more than 50 $\mu$m.

18. A lithium secondary battery comprising an electroytic layer, a positive electrode, and a negative electrode that is made of lithium-containing material, in which battery:
   (a) the electrolytic layer is made of an inorganic solid electrolyte; and
   (b) the positive electrode contains an organic high polymer, wherein the electrolytic layer consists of two layers that are a positive electrode-side layer and a negative electrode-side layer.

19. The lithium secondary battery as defined in claim 18, wherein:
   (a) the negative electrode-side layer is a film made of a lithium ion-conductive compound containing sulfide; and
   (b) the positive electrode-side layer is a film made of a lithium ion-conductive compound containing oxide.

20. The lithium secondary battery as defined in claim 18, wherein:
   (a) the electrolytic layer consisting of two layers has a total thickness not less than 2 $\mu$m and not more than 22 $\mu$m; and
   (b) the positive electrode-side layer has a thickness not less than 0.1 $\mu$m and not more than 2 $\mu$m.

21. The lithium secondary battery as defined in claim 18, wherein:
   (a) the negative electrode-side layer contains lithium sulfide and silicon sulfide; and
   (b) the positive electrode-side layer contains at least one type selected from the group consisting of a phosphate compound and a titanate compound.

22. The lithium secondary battery as defined in claim 18, wherein the positive electrode-side layer contains:
   (a) an Li constituent not less than 30 atm. % and not more than 50 atm. %;
   (b) phosphorus; and
   (c) at least one element selected from the group consisting of oxygen and nitrogen.

23. The lithium secondary battery as defined in claim 18, wherein the positive electrode-side layer has a thickness not less than 1% and not more than 50% of the thickness of the negative electrode-side layer.

24. The lithium secondary battery as defined in claim 18, wherein the positive electrode-side layer has a thickness not less than 10 nm and not more than 25 $\mu$m.

25. The lithium secondary battery as defined in claim 18, wherein:
   (a) the positive electrode contains inorganic solid electrolytic particles having lithium-ion conductivity; and
   (b) the inorganic solid electrolytic particles have an ion-conductivity of $10^{-3}$ S/cm or more.

26. A lithium secondary battery comprising an electroytic layer, a positive electrode, and a negative electrode that is made of a lithium-containing material, in which battery:
   (a) the electrolytic layer is made of an inorganic solid electrolyte; and
   (b) the positive electrode contains an organic high polymer, wherein the positive electrode contains an organic electrolyte solution, and the organic solvent contained in the organic electrolyte solution contained in the positive electrode:
      (a) comes into contact with the lithium-containing material that constitutes the negative electrode; and
      (b) thereby gasifies in the vicinity of the contact portion.

27. A lithium secondary battery comprising an electroytic layer, a positive electrode, and a negative electrode that is made of a lithium-containing material, in which battery:

(a) the electrolytic layer is made of an inorganic solid electrode; and
(b) the positive electrode contains an organic high polymer, wherein the positive electrode contains an organic electrolyte solution, and the organic solvent contained in the organic electrolyte solution contained in the positive electrode:
  (a) comes into contact with the lithium-containing material that constitutes the negative electrode; and
  (b) thereby solidifies in the vicinity of the contact portion.

28. A lithium secondary battery comprising an electrolytic layer, a positive electrode, and a negative electrode that is made of a lithium-containing material, in which battery:
(a) the electrolytic layer is made of an inorganic solid electrolyte; and
(b) the positive electrode contains an organic high polymer, wherein the positive electrode contains an organic electrolyte solution, and the organic solvent contained in the organic electrolyte solution contained in the positive electrode contains at least one type of compound selected from the group consisting of compounds having a nitrile group and compounds having olefinic linkage.

29. A lithium secondary battery comprising an electroytic layer, a positive electrode, and a negative electrode that is made of a lithium-containing material, in which battery:
(a) the electrolytic layer is made of an inorganic solid electrolyte; and
(b) the positive electrode contains an organic high polymer, wherein the negative electrode:
  (a) has at its electrolytic-layer side a layer of a metal that forms an alloy or intermetallic compound with lithium; and
  (b) has a multilayer or a graded structure in composition.

30. A lithium secondary battery comprising an electroytic layer, a positive electrode, and a negative electrode that is made of a lithium-containing material, in which battery:
(a) the electrolytic layer is made of an inorganic solid electrolyte; and
(b) the positive electrode contains an organic high polymer, wherein the negative electrode:
  (a) has no oxide layer on its surface; and
  (b) has a sulfide or nitride layer on its surface.

31. A lithium secondary battery comprising an electroytic layer, a positive electrode, and a negative electrode that is made of a lithium-containing material, in which battery:
(a) the electrolytic layer is made of an inorganic solid electrolyte; and
(b) the positive electrode contains an organic high polymer, wherein the electrolytic layer is formed directly on the surface of the negative electrode without the medium of an oxide layer.

32. A lithium secondary battery comprising an electroytic layer, a positive electrode, and a negative electrode that is made of a lithium-containing material, in which battery:
(a) the electrolytic layer is made of an inorganic solid electrolyte; and
(b) the positive electrode contains an organic high polymer, wherein:
  (a) the positive and negative electrodes are each provided with a collector; and
  (b) the electrolytic layer is formed directly on the negative electrode-side collector without providing a lithium-containing material as the negative electrode.

* * * * *